US012759904B2

(12) United States Patent
Whetstone

(10) Patent No.: US 12,759,904 B2
(45) Date of Patent: *Oct. 13, 2026

(54) SURFACE SKIMMER LIFTING DEVICE

(71) Applicant: Monte Whetstone, Nevada, IA (US)

(72) Inventor: Monte Whetstone, Nevada, IA (US)

( * ) Notice: Subject to any disclaimer, the term of this patent is extended or adjusted under 35 U.S.C. 154(b) by 415 days.

This patent is subject to a terminal disclaimer.

(21) Appl. No.: 18/328,244

(22) Filed: Jun. 2, 2023

(65) Prior Publication Data

US 2023/0303412 A1 Sep. 28, 2023

Related U.S. Application Data

(63) Continuation of application No. 17/576,326, filed on Jan. 14, 2022, now Pat. No. 11,702,350.

(60) Provisional application No. 63/139,536, filed on Jan. 20, 2021.

(51) Int. Cl.
*C02F 1/40* (2023.01)
*B01D 21/24* (2006.01)

(52) U.S. Cl.
CPC ............ *C02F 1/40* (2013.01); *B01D 21/2433* (2013.01); *B01D 21/2438* (2013.01); *C02F 2201/004* (2013.01)

(58) Field of Classification Search
CPC .. C02F 1/40; C02F 2201/004; B01D 21/2433; B01D 21/2438
See application file for complete search history.

(56) References Cited

U.S. PATENT DOCUMENTS

| | | | | |
|---|---|---|---|---|
| 3,465,887 | A | 9/1969 | Cookney | |
| 3,741,399 | A | 6/1973 | Peterson | |
| 4,046,693 | A | 9/1977 | Glover | |
| 4,364,834 | A | 12/1982 | Wawro | |
| 4,432,870 | A * | 2/1984 | Russell ................ | B03D 1/1475 210/221.1 |
| 4,462,909 | A | 7/1984 | Kennel | |
| 4,594,156 | A | 6/1986 | Grujanac et al. | |
| 5,022,992 | A | 6/1991 | Looker | |
| 5,200,079 | A | 4/1993 | Schwartz et al. | |
| 5,376,269 | A | 12/1994 | Sauvage et al. | |
| 5,423,987 | A | 6/1995 | Fujiwara | |
| 5,454,942 | A * | 10/1995 | Ljungberg ............. | B01D 21/20 210/776 |
| 6,126,824 | A | 10/2000 | Hanford et al. | |

(Continued)

*Primary Examiner* — Liam Royce
(74) *Attorney, Agent, or Firm* — Goodhue, Coleman & Owens, P.C.

(57) ABSTRACT

A lifting mechanism for a wastewater plant skimmer arm is provided. The device includes a member. A pair of attaching members are each connected to the member via a hinge. The pair of attaching members are parallel from each other. A skimming member is connected to the pair of attaching members, and parallel to the member. A clamp with a pin is mounted to the member. A flat bar is connected to the clamp and pivots about the pin. The flat bar includes a hook and a plurality of notches. A U-bolt placed on the skimming member includes a rod, that may engage with the hook or a notch of the plurality of notches on the flat bar. The hook may lift the skimming member by engaging with the rod. The desired position of the skimming member may be secured by engaging with a notch of the plurality of notches.

8 Claims, 2 Drawing Sheets

(56) References Cited

U.S. PATENT DOCUMENTS

| | | | | |
|---|---|---|---|---|
| 11,702,350 | B2 * | 7/2023 | Whetstone ................ | C02F 1/40<br>210/241 |
| 2019/0152809 | A1 | 5/2019 | Strottner | |
| 2021/0331091 | A1 | 10/2021 | Beaman et al. | |

* cited by examiner

SURFACE SKIMMER LIFTING DEVICE

CROSS REFERENCE TO RELATED APPLICATIONS

This application claims the benefit of U.S. Provisional Application No. 63/139,536 filed on Jan. 20, 2021. The above identified patent application is herein incorporated by reference in its entirety to provide continuity of disclosure.

BACKGROUND OF THE INVENTION

The present invention relates to a lifting mechanism for a wastewater plant skimmer. More specifically, the present invention provides a lifting mechanism for a wastewater plant skimmer that has a clamp connected to a flat bar with a plurality of notches and a hook that engages a U-bolt mounted to a skimming arm containing a skimming blade.

In wastewater plants and in other treatment centers, there are typically one or more large tanks. Wastewater plants use these tanks in a treatment system in order to purify wastewater for other uses. To purify the water, each tank will remove debris and toxins until the end of the treatment system produces purified water. To remove the debris and toxins from the liquid, the tank will include a skimming arm. The skimming arm is used to remove the floating solids, such as scum and grease, from the surface of the liquid. Typically, the skimming arm makes constant revolutions around the surface of the liquid to properly remove the sludge. To have the toxins be properly removed by the skimming arm, it is important for the liquids to remain in a static state as the skimming arm makes its revolutions. If the liquid is in a dynamic state, it will prevent the skimming arm from efficiently removing the desired toxins. The skimming arm will push the debris along the surface of the liquid and, typically, will remove the debris from the tank when the extraction process is initiated. This process of purifying wastewater is tedious and requires a lot of precision. Any undesired alteration to the skimming arm may result in a setback that prevents the process from being completed in a timely manner.

Even in difficult weather, the wastewater treatment plants must remain operational. However, the cold winter months in certain areas result in the cold temperatures bringing an additional set of issues that can disturb the wastewater treatment process. Specifically, cold temperatures in the winter may lead to a wastewater treatment plant experiencing freezing. For example, freezing temperatures may cause clogging of the wastewater treatment system or the skimming arm to become frozen to the surface of the liquid or the surrounding surface of the tank. These issues can cause the skimming arm to garner debris and require extensive maintenance. If they are not corrected, the skimming arm may become jammed and may ultimately result in a breaking of the skimmer arm due to a torque overload. A broken skimming arm can render the entire wastewater treatment tank inoperable and can require a lot of resources to fix the skimming arm and correct the wastewater treatment tank.

In addition to the repairs that may be required because of freezing, the wastewater treatment plant may experience a diminished capacity and operational efficiency with the cold temperatures. When the wastewater treatment tanks experience such setbacks, it is often difficult to compensate for that loss. Moreover, the operators at the wastewater treatment plant will constantly monitor the wastewater treatment tanks to limit the effects of the freezing temperatures. Typically, the maintenance may include the lifting of the skimming arm up from the surface of the liquid. However, the design of the skimming arms on the wastewater treatment tanks are not conducive to preventing the freezing of the skimming arm by lifting the skimming arm, making it difficult to perform the necessary actions. Specifically, having the skimming arm remain in the desired position to prevent freezing. If an operator fails to correct the freezing effects in a timely matter or the wastewater treatment tank lacks the ability to limit the freezing, the wastewater treatment plant will experience the previously discussed setbacks.

Therefore, there is a defined need amongst the known prior art references for a lifting mechanism for a wastewater plant skimmer that allows the skimming arm to be properly lifted to limit the damages caused by freezing and to allow the skimming arm to be secured in a desired position.

SUMMARY OF THE INVENTION

In view of the foregoing disadvantages inherent in the known types of lifting mechanism for a wastewater plant skimmer now present in the known art, the present invention provides a flat bar with a plurality of notches and a hook that engages with a U-bolt to lift and secure the position of a skimming arm.

It is therefore an object of the present invention to provide a flat bar that permits a skimming arm to be lifted and the skimming arm's position secured. When a wastewater plant skimming arm needs to be lifted to counter the effects of freezing, it is often difficult to do so with the commonly used devices. The present invention will include a flat bar. A hook on the end of the flat bar will lift the skimming arm via a U-bolt. The hook will engage with a rod within the U-bolt, so that when a user lifts the flat bar, the skimming arm will lift above the surface of the liquid in the wastewater tank. Additionally, when the operator lifts the skimming arm, the U-bolt may slide down the flat bar and engage with a notch of a plurality of notches so that the skimming arm may be secured in a desired, elevated position. In this way, the skimming arm will not be in direct contact with the liquid in the wastewater tank and limit the chances that the skimming arm experiences the difficulties that arise during freezing temperatures.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
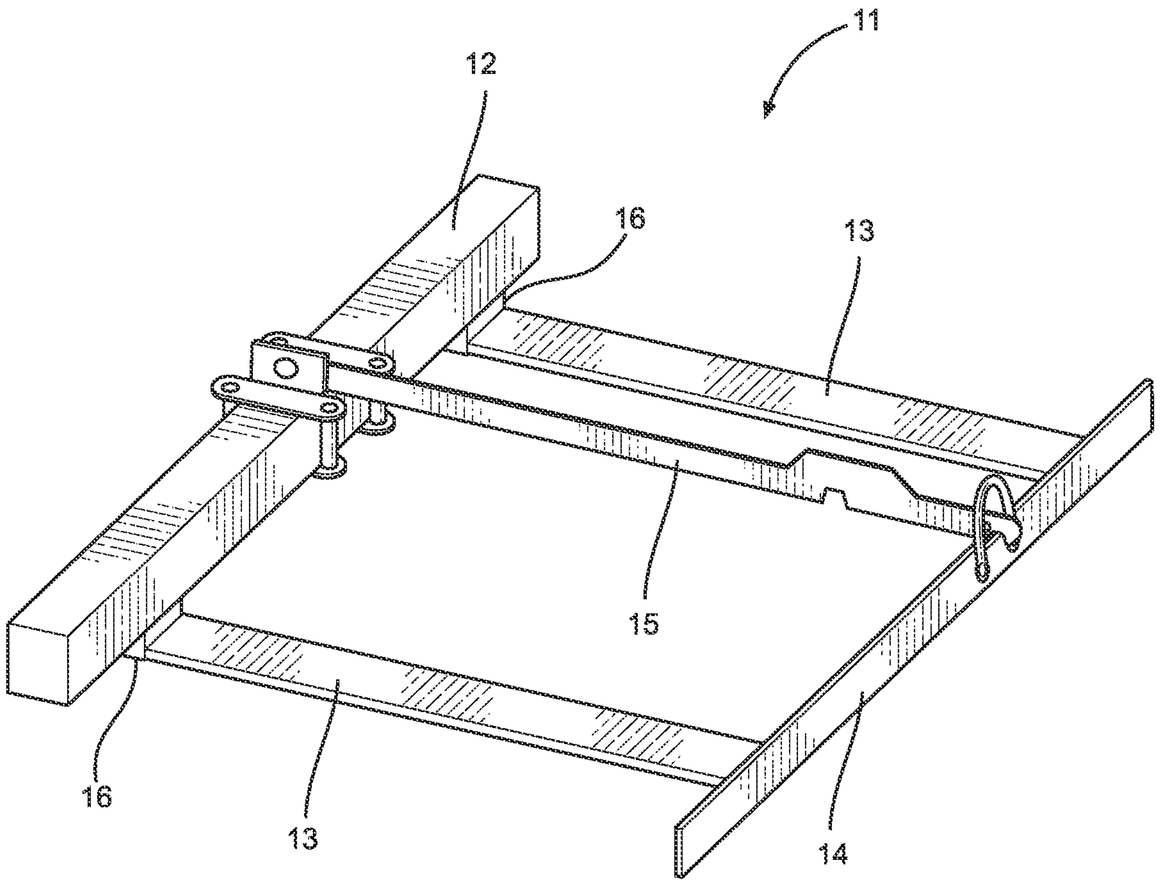
FIG. 1 shows a perspective view of an embodiment of the lifting device for a wastewater plant skimming arm.

Reference is made herein to the attached drawings. Like reference numerals are used throughout the drawings to depict like or similar elements of the lifting device for a wastewater plant skimmer device. The figures are intended for representative purposes only and should not be limiting in any respect.

FIG. 1 shows a perspective view of an embodiment of a lifting device for a wastewater plant skimming arm. The surface skimmer lifting device 11 comprises a member 12, a flat bar 15, a skimming member 14, and a pair of attaching members 13. In the shown embodiment, the member 12 is rectangular shaped. The member 12 includes a top face and a bottom face. Each attaching member of the pair of attaching members 13 is connected to the bottom face of the member 12 via a hinge 16. The hinge 16 allows for each attaching member of the pair of attaching members 13 to pivot about the member 12. The pair of attaching members 13 are parallel and extend from opposing ends of the member 12 in a same direction. The end of the pair of the attaching members 13 most distal from the member 12 connect with the skimming member 14. The skimming member 14 includes a top side and a bottom side. The flat bar 15 extends from the member 12 to the skimming member 14. The flat bar 15 is parallel with the pair of attaching members 13. Additionally, the flat bar 15 is centrally located between the pair of attaching members 13 while extending across the member 12 and the skimming member 14.

Figure 2:
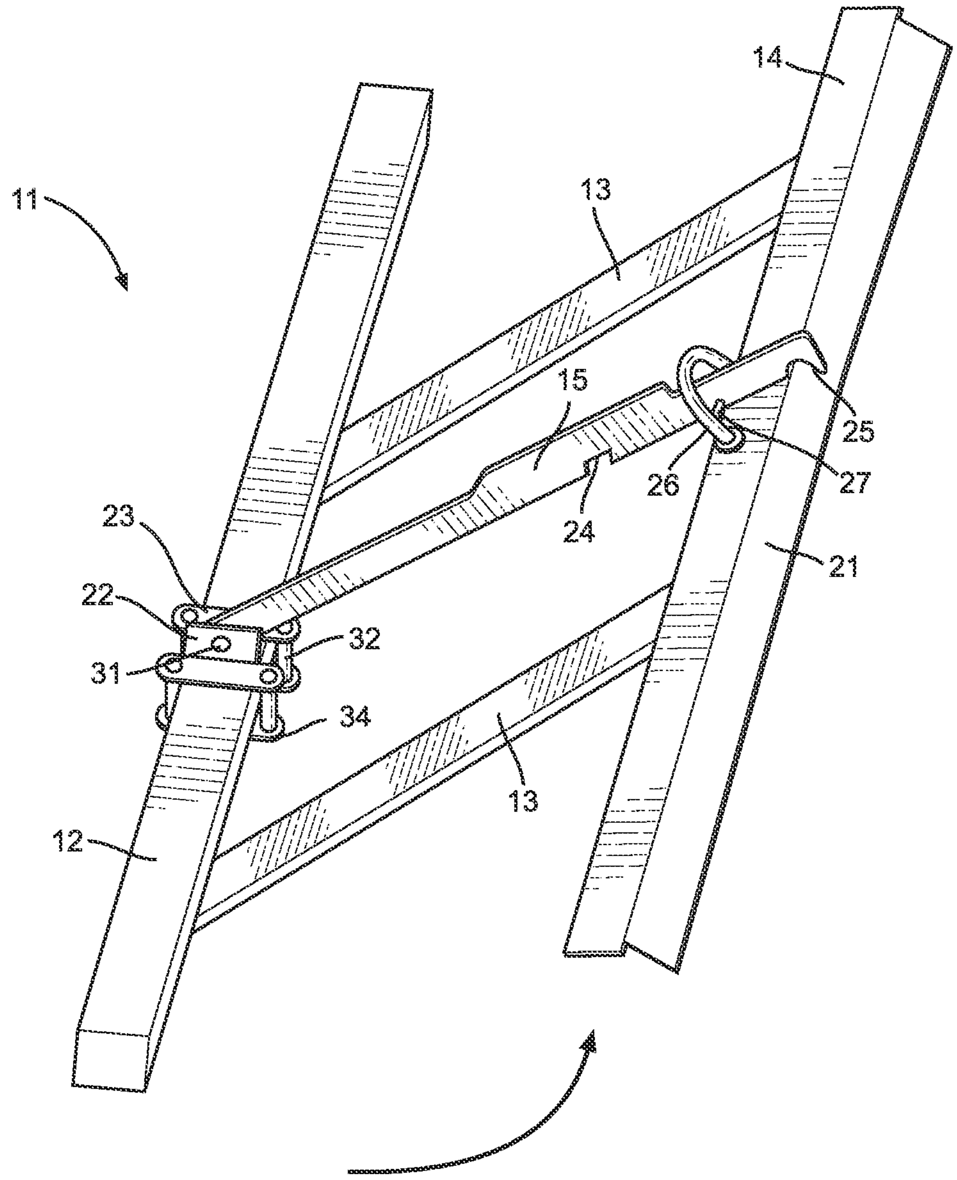
FIG. 2 shows a perspective view of an embodiment of the lifting device for a wastewater plant skimming arm.

FIG. 2 shows a perspective view of an embodiment of a lifting device for a wastewater plant skimming arm. The surface skimmer lifting device 11 includes a clamp 22 and a U-bolt 26. The clamp 22 secures the flat bar 15 to the member 12. A pair of supports are disposed on each side of the clamp 22. Each support of the pair of supports includes an upper support 23, a lower support 34, and a pair of side supports 32. Together, the upper support 23, the lower support 34, and the pair of side supports 32 encircles the member 12. The upper support 23 is along the top face of the member 12, the lower support 34 is along the bottom face of the member 12, and the pair of side supports 32 are sandwiched between the upper support 23 and the lower support 34. The clamp 22 further comprises a pin 31. The flat bar 15 may pivot about the clamp 22 via the pin 31. The clamp 22 allows the flat bar 15 to pivot along an axis perpendicular to a longitudinal axis of the member 12. The clamp 22 will also prevent the flat bar 15 from experiencing any movement along an axis parallel to a longitudinal axis of the member 12. When the flat bar 15 pivots about the clamp 22, the pair of attaching members 13 also pivot about the respective hinge that connects the pair of attaching members 13 to the bottom face of the member 12.

The skimming member 14 includes a top side and a bottom side. The bottom side of the skimming member 14 includes a skim blade 21. The skim blade 21 is configured to skim the surface of a liquid placed within a tank that connects with the lifting surface skimmer lifting device 11. When in contact with the liquid, the skim blade 21 may alter the position of any debris or undesirable along the surface of the liquid. A U-bolt 26 is disposed on the top side of the skimming member 14. The U-bolt 26 is oriented in such a way that the ends of the U-shape are contacting the top side of the skimming member 14 and the rounded end of the U-shape extends upwardly from the skimming member 14. The U-bolt 26 further includes a rod 27. The rod 27 extends through the middle of the U-bolt 26. The flat bar 15 has a distal end. The distal end of the flat bar 15 is the end further away from the clamp 22 secured on the member 12. The distal end of the flat bar 15 extends through the U-bolt 26. The flat bar 15 includes a plurality of notches 24. The distal end of the flat bar 15 further includes a hook 25. The hook 25 is configured to engage with the rod 27 of the U-bolt 26. When engaged, the hook 25 will allow an operator to lift the skimming member 14. The plurality of notches 24 is also configured to engage with the rod 27 of the U-bolt 26. When engaged, the plurality of notches 24 will allow an operator to retain the skimming member 14 in an elevated position.

When the hook 25 engages with the rod 27 the skimming member 14 may be lifted by an operator. During the lifting of the skimming member 14 the flat bar 15 will pivot about the clamp 22 and the pair of attaching members will pivot about their respective hinge that connects the pair of attaching members to the bottom face of the member 12. After lifting the skimming member 14 to a desired position, the hook 25 disposed on the distal end of the flat bar 25 will disengage with the rod 27. The U-bolt 26 and the rod 27 will slide down the flat bar 15 towards the member 12. The rod 27 will engage with a notch of the plurality of notches 24 along the flat bar 15. When the rod 27 engages with a desired notch of the plurality of notches 24, the skimming member 14 will remain static in a lifted position. The clamp 22 secures the flat bar's 15 position. The coupling of the notch of the plurality of notches 24 and the rod 27 allows the skimming member 14 to remain in a static, elevated position. When the skimming member 14 is in the static, elevated position, convenient cleaning and maintenance may be performed. The skimming member 14 will remain in the lifted position until an operator performs a proper action to release the rod 27 from the notch of the plurality of notches 24 and allow the U-bolt 26 and the rod 27 to slide down the flat bar 15 away from the member 14. Each hinge allows the respective attaching member of the pair of attaching member 13 to pivot at an angle independent of an angle that the flat bar 15 pivots about the clamp 22. Allowing the pair of attaching member 13 and the flat bar 15 to pivot at different angles relative to the member 12 permits the position of the skimming member 14 along the length of the flat bar 15 to alter as the skimming member 14 is elevated.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A surface skimmer lifting device, comprising:

a member;

a bar pivotally coupled to the member;

a skimming member hingedly connected to the member; and a connector on the skimming member configured to selectively engage the bar;

wherein at least one selective engagement of the connector with the bar enables lifting of the skimming member by pivoting the bar, and at least one of other selective engagements of the connector with the bar secures the skimming member in an elevated position.

2. The surface skimmer lifting device of claim 1, wherein the bar is pivotally coupled to the member via a clamp disposed on the member, the clamp including a pin about which the bar pivots along an axis perpendicular to a longitudinal axis of the member.

3. The surface skimmer lifting device of claim 2, wherein the clamp includes a pair of supports on opposing sides thereof, each support comprising an upper support, a lower support, and a pair of side supports encircling the member to prevent horizontal movement of the bar.

4. The surface skimmer lifting device of claim 1, wherein the skimming member is hingedly connected to the member via a pair of attaching members disposed on opposing ends of the member, each attaching member connected to the member via a hinge, and the bar is centrally located between the pair of attaching members.

5. The surface skimmer lifting device of claim 1, wherein the connector comprises a U-bolt disposed on a top surface of the skimming member, the U-bolt including a rod configured to selectively engage the bar.

6. The surface skimmer lifting device of claim 1, wherein at least one selective engagement of the connector with the bar comprises a hook and a plurality of notches, wherein engagement of the connector with the hook enables lifting of the skimming member, and engagement of the connector with one of the plurality of notches secures the skimming member in the elevated position.

7. The surface skimmer lifting device of claim 1, wherein at least one selective engagement of the connector with the bar comprises a hook disposed on an end of the bar distal from the pivotal coupling to the member.

8. The surface skimmer lifting device of claim 1, further comprising:

a skim blade disposed on a bottom surface of the skimming member.

* * * * *